United States Patent [19]
Campagnolo

[11] Patent Number: 5,806,372
[45] Date of Patent: Sep. 15, 1998

[54] CONTROL DEVICE FOR A BICYCLE DERAILLEUR COMPRISING SPRING MEANS OPPOSING THE DERAILLEUR SPRING

[75] Inventor: Valentino Campagnolo, Vicenza, Italy

[73] Assignee: Campagnolo Srl, Vicenza, Italy

[21] Appl. No.: 731,732

[22] Filed: Oct. 21, 1996

[30] Foreign Application Priority Data

Oct. 19, 1995 [IT] Italy ................................ TO95A0846

[51] Int. Cl.⁶ .......................... B62M 25/04; B62K 11/14; B62K 23/06
[52] U.S. Cl. .......................... 74/473.14; 74/142; 74/489; 74/473.28; 74/502.2; 116/28.1
[58] Field of Search ............... 74/142, 143, 475, 74/489, 502.2, 473.14, 473.28; 116/28.1

[56] References Cited

U.S. PATENT DOCUMENTS

| 5,012,692 | 5/1991 | Nagano | 74/142 X |
| 5,257,683 | 11/1993 | Romano | 74/475 X |
| 5,400,675 | 3/1995 | Nagano | 74/489 X |

*Primary Examiner*—Allan D. Herrmann
*Attorney, Agent, or Firm*—Sughrue, Mion, Zinn, Macpeak & Seas, PLLC

[57] ABSTRACT

A control device for a bicycle derailleur includes a rotor for winding a flexible cable for controlling the derailleur, and springs means interposed between the rotor and a support body of the device and able to oppose the return action of the spring of the derailleur.

3 Claims, 4 Drawing Sheets

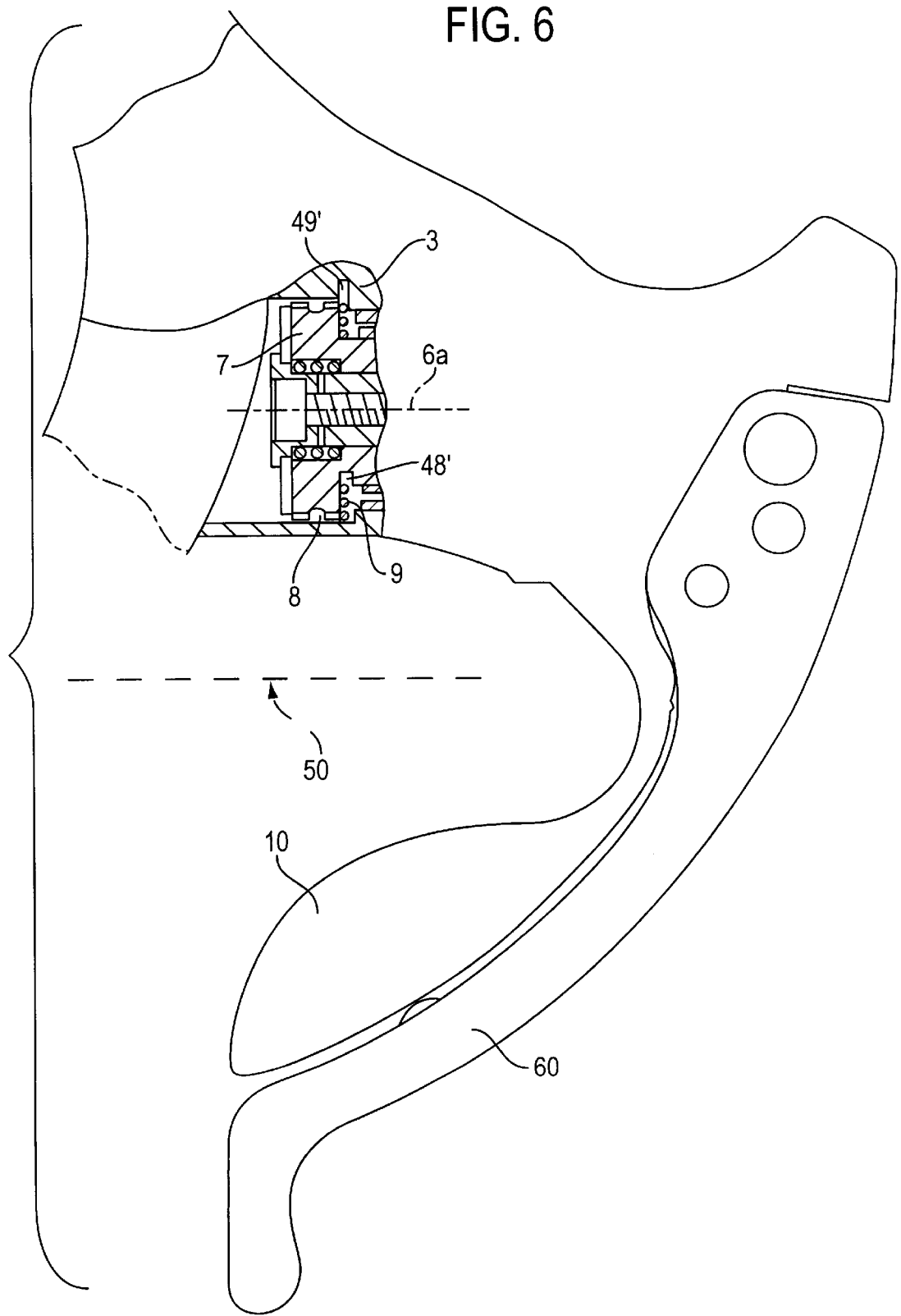

5,806,372

CONTROL DEVICE FOR A BICYCLE DERAILLEUR COMPRISING SPRING MEANS OPPOSING THE DERAILLEUR SPRING

BACKGROUND OF THE INVENTION

The present invention relates to speed change control devices for bicycles, such as "mountain-bikes" or race bicycles.

In his Italian patent application No. TO92A00316 filed on 7 Apr. 1992, laid open to public inspection on 7 Oct. 1993, as well as in his Italian patent application No. TO93A00263 filed on 20 Apr. 1993, laid open to public inspection on 20 Oct. 1994, the Applicant has disclosed speed change control devices for bicycles respectively "mountain-bikes" and race bicycles, comprising:

a support body to be fixed to the bicycle handlebar, a rotor rotatably mounted on the support body and provided with means for winding a flexible cable for controlling the speed change, indexing means for defining a plurality of stable positions of the rotor, corresponding to the various speed ratios, said means comprising a toothed wheel fixed to the rotor and at least one resilient element carried by the support body and able to engage into the vanes between the teeth of the toothed wheel, a pair of ratchet devices associated with said rotor and controlled by two respective control levers, for causing rotation of the rotor in the two directions of rotation, respectively.

In the above described known solution, said flexible control cable is to be connected to a front or rear derailleur of a bicycle, which, according to the conventional art, comprises a movable part which is biased by a return spring of the derailleur towards a position corresponding to engagement of the bicycle chain with the rear sprocket (in case of a rear derailleur) or the front gear (in case of front derailleur) having the smallest diameter. Therefore, when the cyclist must actuate the derailleur in order to cause chain up-shifting on sprockets or gears of greater diameter, he must apply an effort sufficient to overcome the return force of the derailleur spring.

SUMMARY OF THE INVENTION

The object of the present invention is that of providing a control device of the type indicated at the beginning of the present description, which keeps all the advantages of this known device while reducing the effort requested to the cyclist to control the derailleur.

In view of achieving this object, the control device according to the invention is characterized in that between the support body and the rotor there are interposed spring means tending to exert on the rotor an action opposite to that exerted by the return spring of the derailleur through the control cable. Due to this feature, if the rotor were not held by said indexing means, it would reach a position intermediate between the two end positions corresponding to the lower and greater speed ratios. As a result of this, the greatest effort which must be exerted by the user to actuate the device in the most unfavourable condition is lower than the greatest effort which would be necessary in the conventional solutions to overcome the return spring of the derailleur. In other words, by using said spring means which partially balance the return action of the spring of the derailleur, actuation of the rotor by the cyclist is easier and more convenient.

DESCRIPTION OF THE DRAWINGS

The invention will be now described with reference to the annexed drawings given purely by way of non-limiting example, in which:

FIG. 6 shows the application of the device according to the invention to a race bicycle.

DETAILED DESCRIPTION OF THE INVENTION

Figure 1:
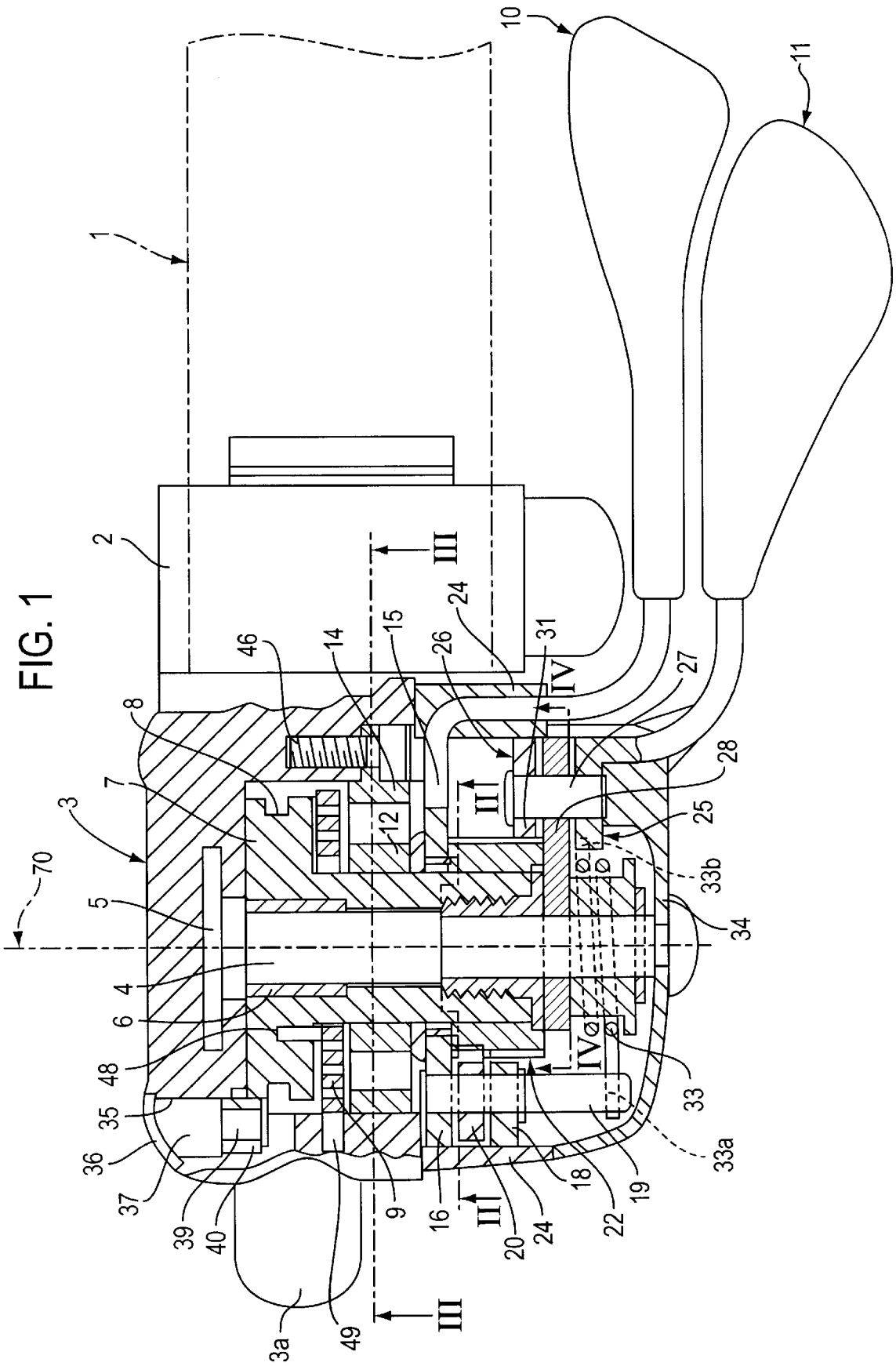
FIG. 1 is a cross-sectional view of a control device according to the invention, applied to a "mountain-bike"

In FIGS. 1–5, by dotted lines there is indicated a portion of an handlebar 1 of a mountain-bike on which there is clamped, in a way known per se, a sleeve 2 connected to a support body 3. The drawings do not show the details of sleeve 2 since the latter is made in any known way, according to a conventional art in the field of bicycles. The body of plastic material 3 carries a shaft 4 whose upper end 5 is embedded within body 3 during moulding of the latter.

In the present description, and the following claims, the terms "upper" and "lower" are used with reference to the orientation of the device in the mounted condition on the bicycle, with the bicycle itself being in an operative position.

On shaft 4 there is rotatably mounted by means of a bush 6 a rotor 7 having a vertical disposed axis 70 when the bicycle is disposed in the operation position. The rotor 7 has a circumferential groove 8 for winding a flexible metal cable (not shown in the drawings) which projects from body 3 at a nose 3a thereof (FIG. 5) and is connected a conventional front or rear derailleur of the bicycle, which on its turn is provided with the conventional return spring tending to hold the movable part of the derailleur in the position corresponding to engagement of the bicycle chain with the sprocket or gear of smallest diameter.

According to the invention, between rotor 7 and support body 3 there is interposed a spiral spring 9 which exerts on the rotor a return action opposite to that exerted by the return spring of the derailleur. The spring 9 has end tails 48 and 49 connected to the rotor 7 and the support body 3, respectively. As already indicated above, a lowering of the greatest effort requested to the cyclist for controlling rotation of the rotor in the most unfavourable condition is obtained.

In order to cause rotation of the rotor in the two directions of rotation respectively, there are provided two control levers 10, 11 which control two respective ratchet devices associated with rotor 7.

As clearly shown in FIG. 1, the arrangement of said ratchet devices is such that the two handling ends of levers 10, 11 are arranged in positions close to each other and both below the handlebar 1, in the mounted condition of the device on the handlebar, so that they can be controlled easily by the cyclist without modifying the position of the hands on the handlebar and without any interference with the handlebar itself. The details of said ratchet devices will be described hereinafter.

In order to provide a snap-like reference of the various operative positions of the rotor 7 corresponding to selection of the various speed ratios, there are provided indexing means, comprising a toothed wheel 12 rotatably connected to rotor 7 (see also FIG. 3) and co-operating with two pin springs 13 which are fixed at diametrically opposite positions inside a ring 14 provided with ears 14b which are fixed to the support body 3 by means of screws 46 (only one of which is visible in FIG. 1). The toothed wheel 12 is rotatably connected to rotor 7 since the latter has two planner opposite faces 7 a and toothed wheel 12 has a central aperture with a profile corresponding to the resulting profile of the cross-section of rotor 7. Each pin spring 13 has a fixed portion ending with one end 13a anchored within a corresponding inner cavity of ring 14, and a flexible portion 13b ending with a free end able to engage selectively into the vanes 12a of the toothed wheel 12 to provide a snap-like reference of the various operative positions of rotor 7. The ring 14 further has on its circumferential edge a portion 14a extending axially downwardly (not visible in FIG. 1) which acts as a stop element, as will become apparent in the following.

A first control lever 10 is for controlling down-shifting of the bicycle chain from a sprocket of greater diameter to a sprocket of smaller diameter in the sprockets assembly associated with the rear wheel of the bicycle (in case the illustrated device is used for controlling the rear derailleur) or from a gear of greater diameter to a gear of smaller diameter in the gear assembly associated with the crank axle (in case the illustrated device is used for controlling the front derailleur). The control lever 11 serves instead for causing up-shifting of the chain from smaller sprockets to greater sprockets or from smaller gears to greater gears. The control lever 10 for chain down-shifting is actuated by pulling it towards the viewer, out of the plane of the sheet of FIG. 1 (clockwise rotation in FIG. 2), whereas control lever 11 is actuated by pushing it towards the plane of the sheet of FIG. 1 (anti-clockwise rotation with reference to FIG. 4). As it will become clearly apparent in the following, upon each actuation, both lever 10 and lever 11 return to their starting positions.

Lever 10 is connected in one piece to a plate 15 freely rotatably mounted around rotor 7 and having a portion 16 diametrically opposite to the lever 10 from which there extends a wall 17 perpendicular to plate 15, which further extends on its turn into a further wall 18 parallel to and spaced from plate 15. The parallel plate 16 and the facing wall 18 are used to rigidly support a pin 19 on which there is freely rotatably mounted a pawl 20 able to co-operate with first teeth 21 of a toothed wheel 22 rigidly connected to rotor 7 and biased by a spring 23 interposed between pawl 20 and wall 17 towards a position in which it engages teeth 22. When the lever 10 is held (by spring means which will be illustrated in the following) in the position shown in FIG. 2, the pawl 20 rests against one end of the fixed appendage 14a which keeps it spaced from teeth 21, against the action of spring 23.

To lever 10, which as shown is rotatably mounted around the axis of rotor 7, there is rigidly connected a circumferential skirt 24 for protecting the mechanism, which rotates along therewith.

Lever 11 has at its end opposite to its handling end a fork portion comprising two parallel and spaced walls 25, 26 between which there is rigidly connected a pin 27. By means of pin 27, said fork end of lever 11 is articulated to a plate 28 which on its turn is freely rotatably mounted on shaft 4. A spring 29 is interposed between a wall 30, forming part of plate 28 and perpendicular to the general plane of this plate, and lever 11, so as to tend to keep a tooth 31 formed on the end of lever 11 (FIG. 4) spaced from second teeth 32 formed on the toothed wheel 22. When lever 11 is actuated, it rotates in an anti-clockwise direction, with reference to FIG. 4, around the axis of pin 27, against the action of spring 29, so as to bring tooth 31 into engagement within a vane between the teeth 32, where upon the further rotation in an anti-clockwise direction of lever 11 causes a simultaneous rotation of lever 11, plate 28 and toothed wheel 22 which is connected to rotor 7.

Both lever 10 and lever 11 are returned upon each actuation thereof towards their starting positions by spring means constituted by a single helical spring 33 having end tails 33a and 33b respectively connected to pin 19 and plate 25 so that spring 30 is operatively interposed between the two levers 10, 11. The use of a single return spring acting on both control levers of the device, renders manufacture and assembling of the device simpler, more reliable and of more reduced cost.

The operation of the above described control device is the following.

Figure 2:
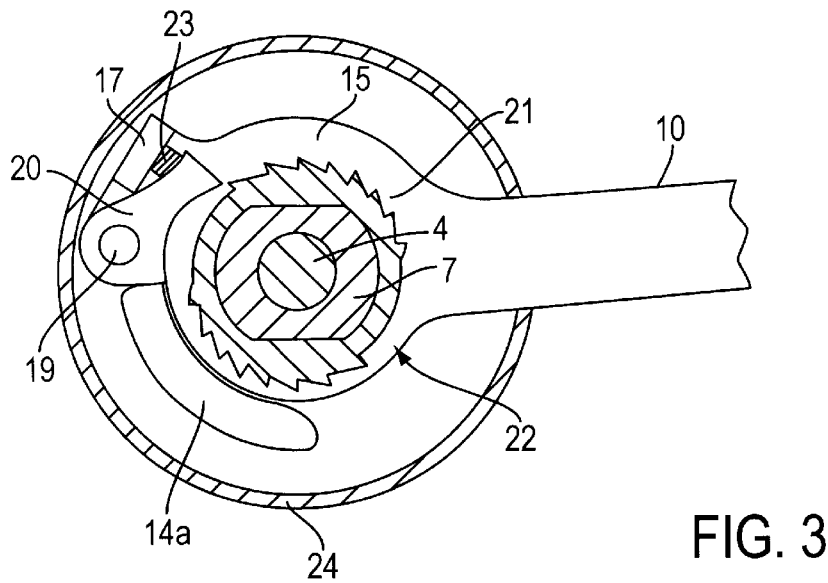
FIGS. 2–4 are cross-sectional views along lines II—II, III—III and IV—IV of FIG. 1.
Figure 3:
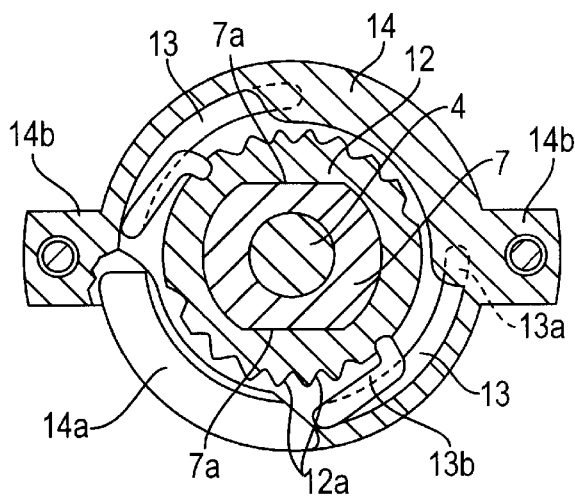
Figure 4:
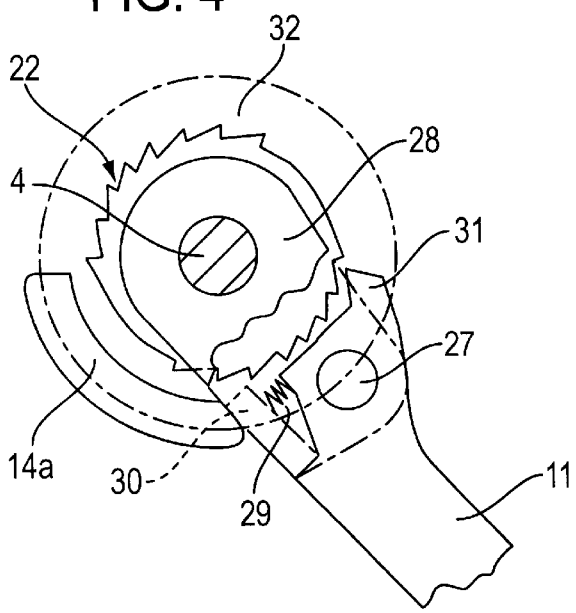
Figure 5:
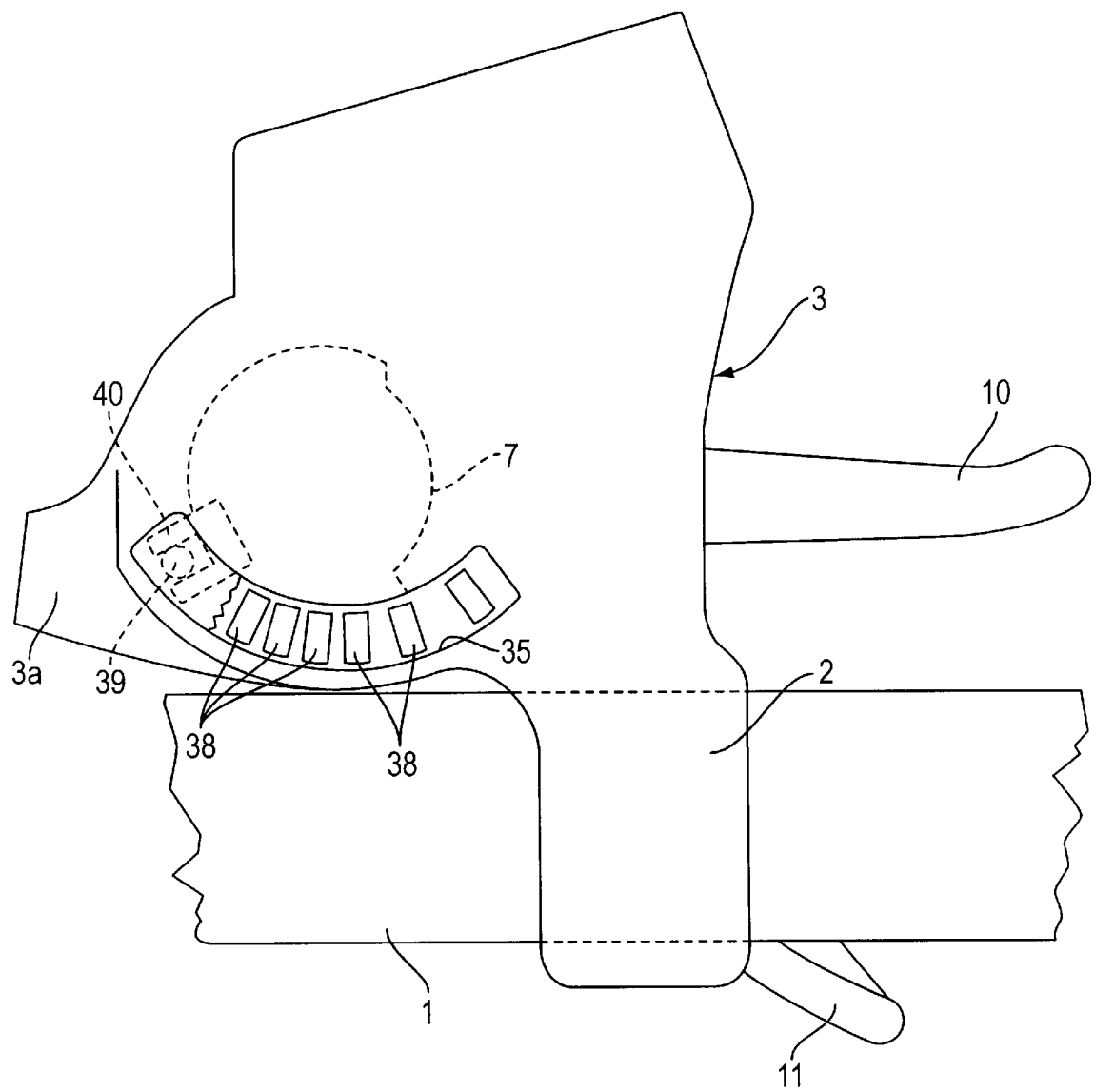
FIG. 5 is a plan view of the device of FIG. 1.

If one wishes to cause down-shifting of the bicycle chain towards smaller sprockets (in case the rear derailleur is controlled) or smaller gears (in case the front derailleur is controlled), lever 10 is actuated by causing it to rotate in a clockwise direction, with reference to FIG. 2, i.e. by pulling it towards the viewer out of the plane of the sheet of FIG. 1. With reference to FIGS. 5, 6, which show the device mounted adjacent to the right end of the handlebar of a "mountain-bike", this can be made by the cyclist without modifying the position of the hand on the handlebar, by simply putting one or more fingers on the front surface of lever 10 and pulling the latter rearwardly (i.e. downwardly with reference to FIG. 5). Upon each actuation, lever 10, if released, returns to its starting position and can be actuated again. Each oscillation of lever 10 can cause chain shifting over one or more sprockets or gears, as a function of the oscillation imparted to the lever. With reference to FIG. 2, the clockwise rotation of lever 10 causes the movement of pawl 20 away from appendage 14a, so that pawl 20 is free to come into engagement, pushed by spring 23, with teeth 21 of toothed wheel 22. The latter is thus compelled to rotate, causing thereby a corresponding rotation of rotor 7, which causes the unwinding of the control cable from groove 8 and the resulting movement of the movable part of the derailleur. The greatest effort requested to the cyclist to actuate the derailleur, in the most unfavourable condition, is lower than that requested in the conventional solutions, since the return force of the spring associated with the derailleur is at least partially compensated by the opposite action of the spiral spring 9. Each operative position of the rotor corresponding to the selection of a determined speed ratio is signalled by the snap engagement of pin springs 13b into corresponding vanes 12a of toothed wheel 12. upon each actuation, when lever 10 is released, it returns to its starting position shown in FIG. 2, defined by the engagement of appendage 14a against pawl 20, under the action of spring 33.

Similarly, when lever 11 is actuated by pushing it towards the plane of FIG. 1, i.e. by causing it to rotate in an anti-clockwise direction, with reference to FIG. 5, using the thumb of the hand which holds the handlebar, lever 11 rotates around the axis of pin 7 with respect to plate 28, bringing tooth 31 into engagement with teeth 32, where upon it rotates along with plate 28 and wheel 22 causing a rotation of rotor 7 and the resulting winding of the control cable of the derailleur into groove 8. When lever 11 is released, spring 33 returns it to the starting position shown in FIG. 4, in which plate 28 abuts against the end of appendage 14a opposite to that which acts as a stop element for pawl 20. Also in this case, during actuation of the lever, the various operative positions of the rotor are signalled by the snap engagement of pin springs 13b into the vanes of toothed wheel 12.

As shown, both levers 10, 11 have handling ends which move in planes parallel and close to each other, and both arranged below the handlebar 11, out of the interference with the latter, so that these levers can be actuated easily by the cyclist without modifying the position of his hand on the handlebar.

Yet with reference to FIG. 1, the device is protected at its lower part by a bottom wall 34, fixed to the lower end of shaft 4.

In order to provide the cyclists with a display of the operative position of the device, the support body 3, has at its upper portion an arched slot 35, covered by an upper transparent wall 36, and serving as a guide for a display reference element 37 able to co-operate with a series of windows 38, identified by increasing numbers (not visible in the drawing). The presence of the display reference element 37 below one of windows 38 indicates to the cyclist the selection of the speed ratio corresponding to the number associated with the respective window. Since the arched slot 35 has a curvature with a centre spaced from the axis of rotor 4, the display reference element 37 is provided at its lower part with a cylindrical pin 39 which is a slidebly guided along a radial direction within a C-shaped appendage 40 of rotor 7.

As it will be clearly apparent from the foregoing description, the device according to the invention enables the cyclist to actuate the control levers easily without modifying the position of his hand on the handlebar and hence insuring a greater safety in travel. At the same time, the use of spring means which oppose the return force of the spring associated with the derailleur enables the greatest effort requested for actuating the device to be decreased. The structure of the device is further rendered particularly simple and unexpensive and is constituted by a reduced number of parts. Finally, the means for displaying the selected speed ratio are particularly simple and efficient.

A further feature of the device according to the invention lies in that, as shown in FIGS. 1, 5, the support body 3 of the device has its upper surface, adjacent to the upper end of rotor 7, close to the handlebar 1 and at a level higher with respect thereto, so that the display window 36 is arranged at a position which is ideal for an easy vision by the cyclist, without the need of using transmission devices which are instead necessary in the known solutions, in order to connect the display reference element to the control rotor, which in these known solutions (see for instance EP-A-0 629 545) has its upper end arranged at level lower than the handlebar. The arrangement according to the invention is also preferable with respect to other known solutions (see for instance EP-A-0 615 896) in which the display window is arranged below the handlebar and therefore is difficult to be seen by the cyclist.

The above described device, which can be used on "mountain-bikes" is also the subject of a co-pending patent application of the same Applicant.

FIG. 6 of the annexed drawings shows the variant of the device according to the invention applicable to a race bicycle. The main difference of the device of FIG. 6 with respect to that of FIG. 1 lies in that in this device the rotor 7 is rotatably mounted around an axis 6a which is directed horizontally along the longitudinal direction 50 of the bicycle. In this case, furthermore, according to a technique known per se, the support body 3 is the same body which supports lever 60 controlling the bicycle brake. As clearly visible in FIG. 6, also in this case there is provided a spiral spring 9' having end tails 48' and 49' respectively connected to rotor 7 and support body 3. Spring 9 is therefore operatively interposed between the rotor and body 3 and is able to oppose the return force exerted by the spring of the derailleur to which there is connected the flexible cable which is wound on rotor 7.

Naturally, while the principle of the invention remains the same, the details of construction and the embodiments may widely vary with respect to what has been described and illustrated purely by way of example, without departing from the scope of the present invention.

What is claimed is:

1. Control device for a bicycle derailleur, comprising:

a support body, to be fixed to the bicycle handlebar, a rotor rotatably mounted on the support body and provided with means for winding a flexible cable for controlling the speed change, indexing means for defining a plurality of stable positions of the rotor corresponding to the various speed ratios, said means comprising a toothed wheel fixed to the rotor and at least one resilient element carried by the support body and able to engage into vanes between the teeth of the toothed wheel, a pair of ratchet devices associated with said rotor and controlled by two respective control levers, for causing rotation of the rotor in two directions of rotation, respectively, wherein between the support body and the rotor there are interposed spring means tending to exert on the rotor an action opposite to that exerted by a return spring of the derailleur through the control cable and wherein said spring means are constituted by a spiral spring arranged in a plane perpendicular to the axis of the rotor and having end tails respectively anchored to said support body and said rotor.

2. Control device according to claim 1, in which said support body is to be fixed to the handlebar of a "mountain-bike", wherein, in the mounted condition of the device, the axis of the rotor is directed vertically.

3. Control device according to claim 1, in which said support body constitutes also the support body for the brake control lever of a race bicycle, wherein the axis of the rotor is directed horizontally and parallel to the longitudinal direction of the bicycle.

* * * * *